United States Patent [19]
Grossner et al.

[11] 4,050,550
[45] Sept. 27, 1977

[54] PROCESS AND APPARATUS FOR CONTROLLING THE BRAKE FORCE ON THE WHEELS OF TRAILERS

[75] Inventors: Horst Grossner, Berglen-Lenenberg; Hans Liebold, Adelberg; Jurgen Wehnert, Stuttgart, all of Germany

[73] Assignee: Daimler-Benz Aktiengesellschaft, Germany

[21] Appl. No.: 640,141

[22] Filed: Dec. 12, 1975

[30] Foreign Application Priority Data
Dec. 20, 1974 Germany .............................. 2460450

[51] Int. Cl.$^2$ .............................................. B60T 7/20
[52] U.S. Cl. ...................... 188/112; 188/3 R; 303/7; 303/24 B
[58] Field of Search ........................ 180/103 BH, 104; 188/3 R, 112, 181; 280/446 B; 303/3, 7, 15, 20, 24 B

[56] References Cited
U.S. PATENT DOCUMENTS

| | | | |
|---|---|---|---|
| 3,892,296 | 7/1975 | Depuydt et al. | 188/112 |
| 3,899,216 | 8/1975 | Putman | 303/7 X |

FOREIGN PATENT DOCUMENTS

| | | | |
|---|---|---|---|
| 2,024,406 | 12/1970 | Germany | 188/112 |

*Primary Examiner*—Stephen G. Kunin
*Attorney, Agent, or Firm*—Craig & Antonelli

[57] ABSTRACT

A method and apparatus for controlling the brake force at the wheels of a trailer provided with a tow-bar in the sense of an elimination of the force occurring between the towing vehicle and the trailer, in which the static characteristic magnitude and at least one of the dynamic characteristic magnitudes are combined to form the control magnitude for the brake force of the trailer brake.

37 Claims, 4 Drawing Figures

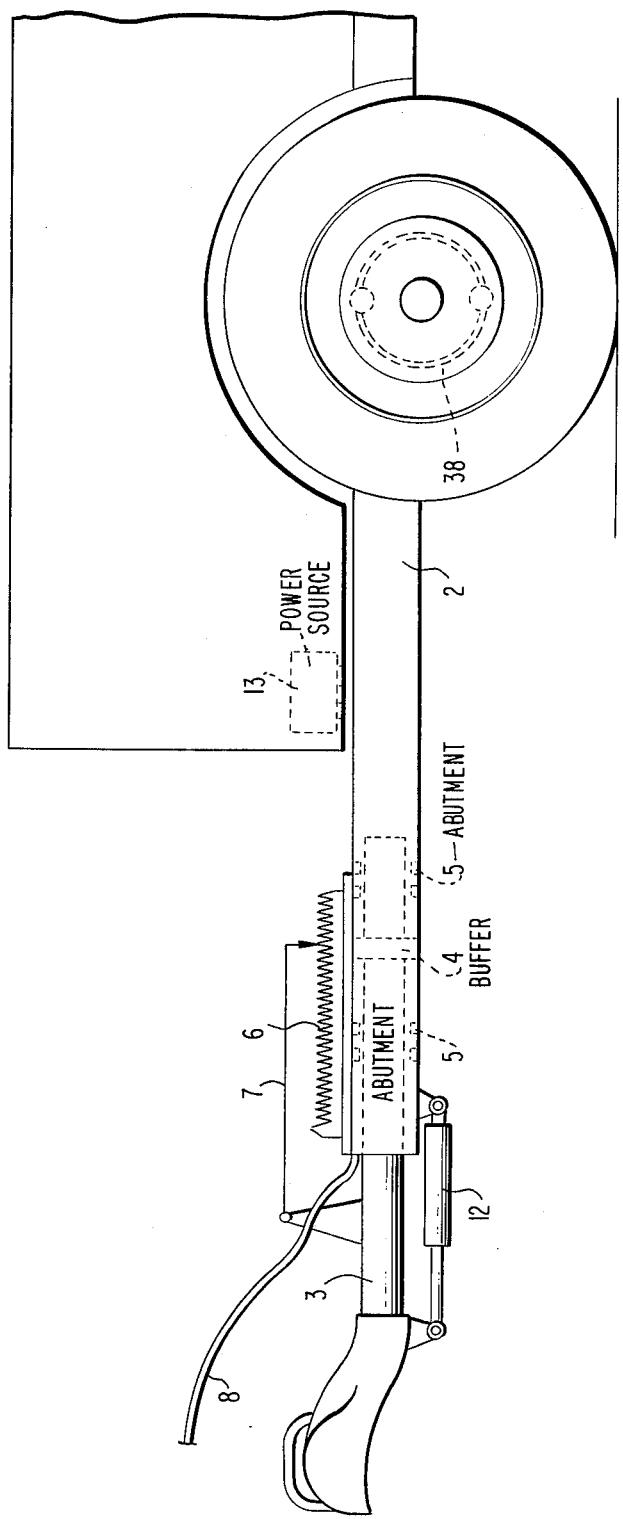

PROCESS AND APPARATUS FOR CONTROLLING THE BRAKE FORCE ON THE WHEELS OF TRAILERS

The present invention relates to a method for controlling the brake force at the wheels of trailers provided with a preferably telescopically retractable tow-bar in the sense of an elimination of the force occurring between the towing vehicle and the trailer. The present invention also relates to an installation for carrying out this method.

The prior art mechanical and hydraulic overrunning brakes offer the advantage that the brake forces are automatically matched to the load conditions of the towing vehicle and trailer as well as to the friction-value fluctuations in the brakes of the towing vehicle and trailer. However, it is disadvantageous in these prior art brakes that an overrunning force is necessary for the brake actuation which constitutes a not insignificant part of the trailer weight and which, in addition to other disadvantages, considerably reduces the attainable overall deceleration. With rapidly initiated, strong brake forces, for example, in case of an emergency braking, a hard overrunning shock occurs as a rule which under certain circumstances leads to jerking oscillations and vibrations in the further progress of the braking action. Furthermore, it is necessary with such types of overrunning brakes that for purposes of driving in the backward direction, at first the trailer brake system has to be disengaged since, when driving backwards, the same effects occur as during the braking of the towing vehicle and therefore the trailer would be braked already during the beginning of the backward drive if the overrunning brake were not disengaged. Additionally, with these prior art overrunning brakes, no braking of the trailer is possible when driving backwards or when stopping on an incline.

With electric brakes used in conjunction with trailers, a manual adaptation of the voltage controlled, for example, in dependence on the brake oil pressure, to the respective towing vehicle weight and trailer weight is always necessary. With all known electric brakes, additionally, friction-value fluctuations and especially the strong reduction of the magnetic actuating force which occurs during the heat-up of the trailer brake, are not compensated for so that in operation one practically always has to reckon with larger towing or compression forces in the tow-bar.

It is therefore the aim of the present invention to avoid the disadvantges of the prior art brake systems and to provide a brake system which responds more effectively and more rapidly and which offers greatest possible driving comforts.

The underlying problems are solved according to the present invention in that the static characteristic magnitude and at least one of the dynamic characteristic magnitudes are measured and are combined at least indirectly for the formation of the control magnitude for the brake force of the trailer brake. The present invention thereby contemplates as static characteristic magnitude the overrunning path of the trailer, i.e., the distance by which the connection of the trailer axle to the trailer coupling changes when the trailer overruns in the direction toward the towing vehicle. Correspondingly, the overrunning velocity and the overrunning acceleration, i.e., the velocity and acceleration with which the trailer runs up toward or overruns the towing vehicle during the braking, are to be understood as first and second dynamic characteristic magnitudes.

This method represents a control of the trailer brakes to a differential velocity of zero between towing and trailer vehicle. The great advantage of this method, in contrast to the known braking system in which an existing interfering or disturbing magnitude is to be controlled, resides in the fact that already the occurrence of the interfering or disturbing magnitude is detected and can be controlled to prevent its occurrence and in that the control is also so rapid that it is able to control disturbances caused, for example, by road holes.

Provision is made that the characteristic magnitudes are influenced prior to the combination by valuation or weighting functions dependent on the static characteristic magnitude. This means that the influence of a characteristic magnitude is emphasized whereas that of another can be de-emphasized an thus an optimum control magnitude matched to the vehicle truck-trailer combination can be formed.

Accordingly, it is an object of the present invention to provide a method and installation to control the brake force at the wheels of trailers which avoids by simple means the aforementioned shortcomings and drawbacks encountered in the prior art.

Another object of the present invention resides in a method and apparatus for the control of the brake force at the wheels of trailers which is more effective and responds more rapidly than the prior art systems as well as offers greatest possible driving comfort.

A further object of the present invention resides in a method and apparatus for controlling the brake force at the wheels of trailers which permits already a detection of any fast appearing interfering magnitudes so as to control the same already at the moment they occur.

Still a further object of the present invention resides in a method and apparatus for the control of the brake force at the wheels of trailers in which a control magnitude can be formed which is optimally matched to the truck-trailer combination.

Still another object of the present invention resides in a method and apparatus for controlling the brake force at the wheels of trailers which permits a backward driving without requiring a manual disengagement of the trailer brake system, yet makes possible a braking of the trailer during stoppage while on an incline.

These and other objects, features, and advantages of the present invention will become more apparent from the following description when taken in connection with the accompanying drawing which shows, for purposes of illustration only, one embodiment in accordance with the present invention, and wherein:

FIG. 4 is a somewhat schematic side elevational view of the construction of a trailer tow bar in accordance with the present invention.

Figure 1:
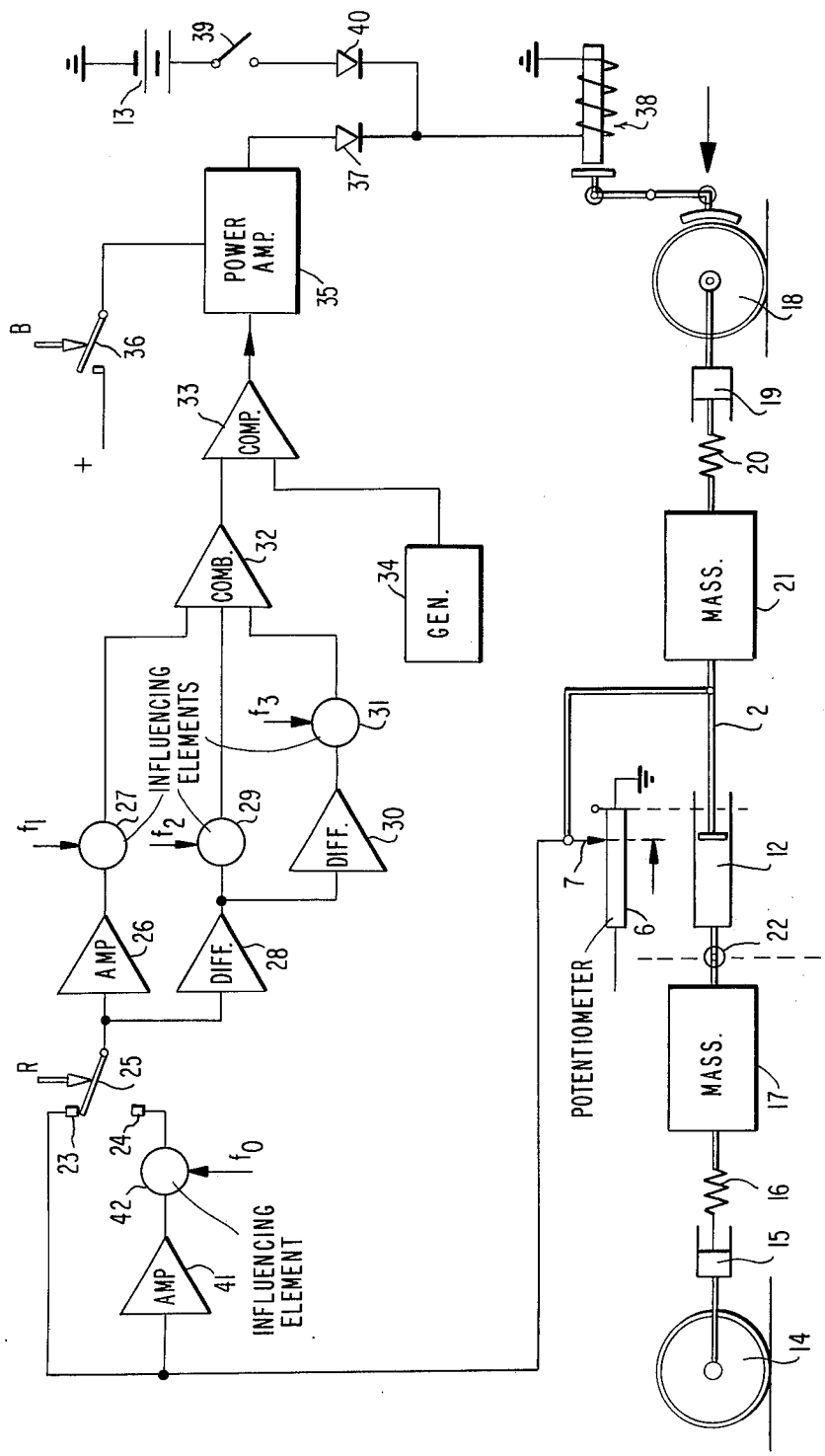
FIG. 1 is a schematic block diagram of a control system for controlling the brake force at the wheels of trailers in accordance with the present invention.

Referring now the drawing wherein like reference numerals are used throughout the various views to designate like parts, and more particularly to FIG. 1, in this figure, the spring-damper-mass system of the towing vehicle is symbolically illustrated by wheel 14, damper or shock absorber 15, spring 16 and mass 17, while the corresponding system of the trailer is symbolically represented by wheel 18, damper or shock absorber 19, spring 20 and mass 21; the trailer is connected with the towing vehicle by way of the tow-bar 2, the shock absorber 12 and the coupling 22. As will be described more fully hereinafter, a potentiometer 6 is so mechanically connected with the two-bar telescope that an electric magnitude proportional to the static characteristic magnitude $s$, i.e., proportional to the overrunning path or travel, is adapted to be picked up at the pick-up or potentiometer arm 7. This magnitude is supplied directly to the contact 23 of a shifting switch 25 and to the contact 24 of the same switch 25 by way of an inverting amplifier 41 and an influencing element 42 of conventional construction connected in series therewith. The shifting switch 25 is displaced or switched from the illustrated position into the other position by a signal R, when the reverse speed is engaged or the back-up lights are switched on. The electric signal proportional to the static characteristic magnitude $s$ reaches by way of the shifting switch 25 simultaneously the inputs of a matching amplifier 26 and of a differentiating element 28. The output of the matching amplifier 26 is connected with the input of a multiplier element 27 whose output is connected with the input of a summing or adding amplifier 32. The output of the differentiating element 28 is connected with the input of a multiplier element 29 and with the input of a further differentiating element 30, whose output is connected with the input of a further multiplier element 31. The outputs of the two multiplier elements 29 and 31 are connected to two further imputs of the summing or adding amplifier 32. The output of the summing or adding amplifier 32 is connected with the input of a comparator 33, to the second input of which is fed a saw-tooth voltage produced by a saw-tooth voltage generator 34. The output of the comparator 33 is connected with the input of a power amplifier 35 whose output is connected by way of a diode 37 with the trailer brake 38 which is illustrated herein as an electric brake though, of course, any other trailer brake system can be used with the control system of the present invention. The power supply for the power amplifier 35 is connected by way of a switch 36 which is closed when the brake pedal B is actuated. A power source 13 accommodated in the trailer acts on the trailer brake 38 in parallel to the output of the power amplifier 35 by way of a switch 39 which is closed when the trailer tears loose from the towing vehicle, and by way of a diode 40.

The electrical magnitude which can be picked up at the sliding member 7 of the potentiometer 6 and which is proportional to the static characteristic magnitude $s$, i.e., to the overrunning path, is fed by way of the contact 23 of the shifting switch 25 to the matching amplifier 26 and simultaneously to the differentiating member 28. An electrical magnitude proportional to the overrunning path or travel appears at the output of the matching amplifier 26. An electrical magnitude proportional to the overrunning velocity appears at the output of the differentiating element 28. The latter is fed to a further differentiating element 30 at the output of which appears an electrical magnitude proportional to the overrunning acceleration. These three characteristic magnitudes are fed by way of one influencing element 27, 29 and 31 each, which in the illustrated embodiment are conventional multiplier elements, to the inputs of a combining element 32 constructed as conventional summing or adding amplifier. The three characteristic magnitudes are multiplied in the multiplier elements 27, 29 and 31 with the functions $f_1$, $f_2$ and $f_3$. In this embodiment the aforementioned functions are constants. However, they may also be functions of a general nature which are dependent on the overrunning path $s$. In this manner, the control magnitude can be matched to any desired control behavior. However, the second dynamic characteristic magnitude $s$, i.e., the overrunning acceleration, may also be dispensed with altogether. In this case, the differentiating element 30 and the influencing element 31 as well as the third input of the combining element 32 are not necessary.

An electric magnitude proportional to the control magnitude appears at the output of the summing amplifier 32. This electric magnitude reaches the first input of a comparator 33, to the second input of which is fed a saw-tooth voltage produced by a generator 34. The control magnitude is converted within the comparator 33 in a known manner with the aid of the saw-tooth voltage into a pulse-width modulation signal. The following power amplifier 35 is thermally less loaded by this measure since the power loss is determined by the current and the collector-emitter saturation voltage. It has been found to be advantageous to maintain the electronic portion of the control apparatus operationally ready during the entire driving operation but to activate the power amplifier 35 only with the beginning of the braking. This takes place by the switch 36 which is connected in the line between the power source and the power amplifier 35 and which is closed by the actuation of the brake pedal B. The output signal of the power amplifier 35 acts in a conventional manner on the trailer brake 28. The usual tow-bar shock-absorber 12 is provided in order to prevent a rapid overrunning of the trailer in the non-braked condition, for example, during speed changes, in case of road holes, up and downhill drives, etc.

During the backward drive, the input magnitudes have to be correspondingly reversed in polarity and possibly have to be weighted or evaluated differently. This takes place in the illustrated embodiment in that the shifting switch 25, when engaging the reverse speed or during the engagement of the back-up lights, is shifted into its second position. The voltage picked-up at the potentiometer 6 is now fed by way of the inverting amplifier 41 in which its sign is reversed, and by way of the influencing element 42 which, in this case, is also a multiplier element and in which the magnitude is multiplied with a function $f_0$ which in this case is also a constant, to the matching amplifier 26 and to the differentiating element 28 where they are further processed in the manner already described.

A voltage or power source 13 is arranged at the trailer which acts by way of a normally open switch 39 and by way of a diode 40 on the trailer brake 38. The switch 39 automatically is closed by conventional means when the trailer tears loose from the towing vehicle.

Figure 2:
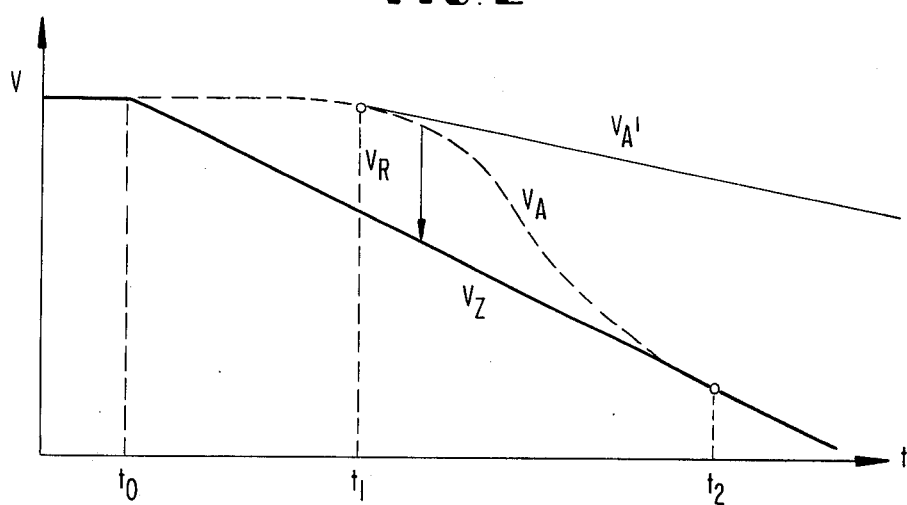
FIG. 2 is a diagram illustrating a typical control progress in the brake system according to the present invention.

In FIG. 2 the progress of the different velocities are plotted against time during a braking operation. One can recognize the velocity of the towing vehicle $v_Z$, the velocity $v_A'$ of the non-braked trailer, the velocity $v_A$ of the trailer braked by means of the control installation according to the present invention and the relative velocity $v_R$ between the towing vehicle and the trailer. In that connection, $t_O$ represents the beginning of the braking operation, $t_1$ the response time point of the trailer brake and $t_2$ the instant, at which the relative velocity $v_R$ between the towing vehicle and the trailer becomes zero if the trailer is equipped with the brake control system in accordance with the present invention. At this instant the relative velocity of a non-braked trailer or of a trailer provided with a prior art brake system would be still very large.

Figure 3:
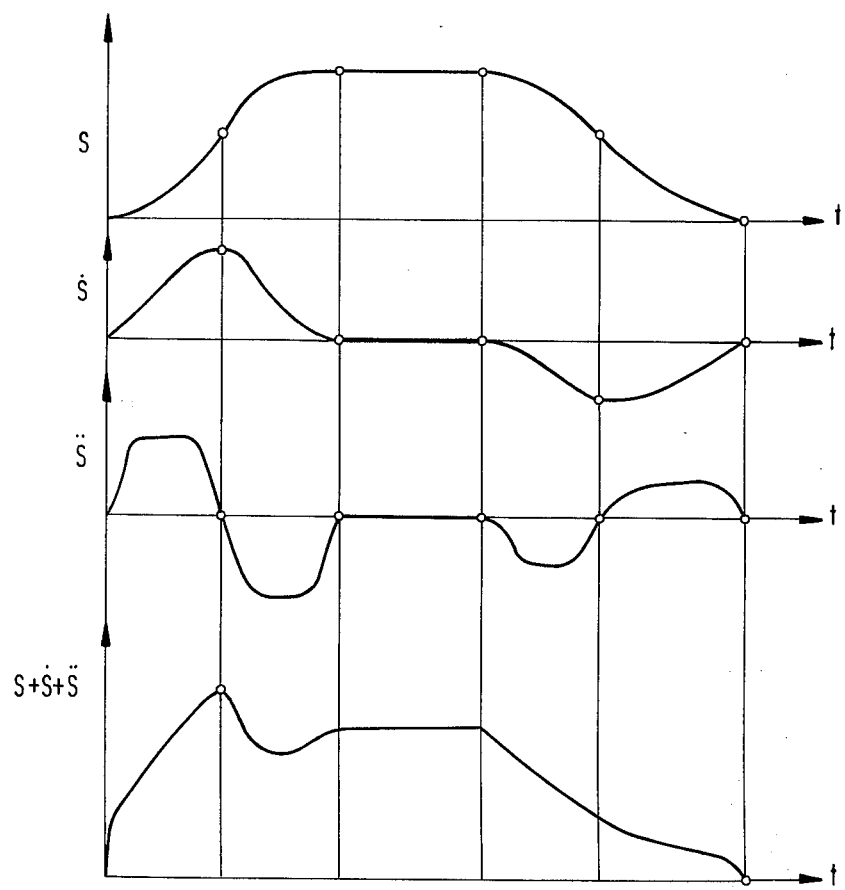
FIG. 3 is a diagram illustrating the characteristic magnitudes and control magnitudes for a control cycle in the system according to the present invention.

The curves of the static magnitude $s$, of the first dynamic characteristic magnitude $s$, of the second dynamic characteristic magnitude $s$ as well as of the summing signal resulting therefrom are illustated in FIG. 3 as control magnitudes plotted for one cycle against time. For reasons of clarity, the illustration of the influencing of the three characteristic magnitudes by the weighting or evaluating functions was dispensed with.

In the trailer illustrated in FIG. 4, the trailer brake is designated by reference numeral 38. The two-bar 2 of the trailer includes a coupling rod 3 adapted to slide telescopically into the tow-bar. The coupling rod 3 has a sufficient overrunning path. The telescopic parts of the two bar 2 and of the coupling rod 3 represent the telescope device. An elastically yielding buffer 4 which is inserted into the free end of the tow bar 2 is seated on the coupling rod 3, which buffer can be moved to and fro together with the coupling rod 3 between abutments 5. The abutment of the buffer 4 at the one or the other abutment 5 represents respectively the furthest deflection of the telescope device. A potentiometer 6 is secured on the tow bar 2 whose pick-up 7 is rigidly connected with the coupling rod 3. The potentiometer 6 is supplied with electric power by way of a cable 8. In order to keep the telescopic deflections within acceptable limits and in order not to cause the brakes of the trailer to respond immediately, a tow-bar shock-absorber 12 is arranged between the tow-bar 2 and the coupling rod 3. A power source 13 is provided in the trailer itself which assures that the brakes of the trailer are actuated if the trailer tears loose from the towing vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for controlling the brake force at the wheels of a trailer provided with a tow-bar in the sense of eliminating forces occurring between the towing vehicle and the trailer, comprising the steps of measuring a static characteristic magnitude and separately measuring at least one of the dynamic characteristic magnitudes, and combining said magnitudes at least indirectly to form the control magnitude for the brake force of the trailer brake.

2. A method according to claim 1, further comprising the steps of influencing the characteristic magnitudes prior to combination thereof by evaluating functions dependent on the static characteristic magnitude.

3. A method according to claim 2, characterized in that the influencing of the characteristic magnitudes takes place by multiplication with evaluating functions.

4. A method according to claim 3, characterized in that the evaluating functions are constants.

5. A method according to claim 4, characterized in that the combination of the characteristic magnitudes influenced by evaluating functions takes place by addition.

6. A method according to claim 5, further comprising the step of reversing the sign of the characteristic magnitudes when driving backwards.

7. A method according to claim 1, characterized in that the combination of the characteristics magnitudes influenced by evaluating functions takes place by addition.

8. A method according to claim 1, further comprising the step of reversing the sign of the characteristic magnitudes when during backwards.

9. A method according to claim 1, wherein the steps of measuring include measuring a static characteristic magnitude which is a time invariant magnitude of forces occurring between the towing vehicle and the trailer and measuring at least one dynamic magnitude which is a time variant magnitude of the forces occurring between the towing vehicle and the trailer.

10. A method according to claim 1, wherein the steps of measuring include measuring a static characteristic magnitude of the forces occurring between the towing vehicle and the trailer at any instant of time and measuring at least one dynamic magnitude indicative at least of the rate of change of forces occurring between the towing vehicle and the trailer.

11. A method according to claim 1, wherein the steps of measuring include providing a signal corresponding to the static characteristic magnitude and a signal corresponding to each dynamic characteristic magnitude of the forces occurring between the towing vehicle and the trailer, and the step of combining includes combining the signal to form a control signal for the brake force of the trailer.

12. A method according to claim 1, wherein the steps of measuring include measuring a static characteristic magnitude of the forces occurring between the towing vehicle and the trailer and forming at least a first derivative with respect to time of the static characteristic magnitude as at least one dynamic characteristic magnitude of the forces occurring between the towing vehicle and the trailer.

13. An apparatus for controlling the brake force at the wheels of a trailer provided with a two-bar means in the sense of eliminating forces occurring between the towing vehicle and the trailer, characterized by measuring means for measuring the static characteristic magnitude and measuring means for measuring at least one of the dynamic characteristic magnitudes, and combining means for combining at least indirectly said characteristic magnitudes to form thereby the control magnitude for the brake force of the trailer brake.

14. An apparatus according to claim 13, characterized by influencing means for influencing the characteristic magnitudes prior to their combination by evaluating functions dependent on the static characteristic magnitude.

15. An apparatus according to claim 14, characteristic in that the influencing means includes multiplication means for influencing the characteristic magnitudes by multiplication with the evaluating functions.

16. An apparatus according to claim 15, characterized in that the evaluating functions of the influencing means are constants.

17. An apparatus according to claim 15, characterized in that the combining means includes summing means for combining the characteristic magnitudes influenced by the influencing means by addition thereof.

18. An apparatus according to claim 17, further comprising means for changing the sign of the characteristic magnitude when driving backwards.

19. An apparatus according to claim 13, further comprising means for changing the sign of the characteristic magnitude when driving backwards.

20. An apparatus according to claim 13, characterized in that the tow-bar means is a telescopically retractable tow-bar.

21. An apparatus according to claim 13, characterized in that the measuring means includes a path pick-up means whose output signal is an electric magnitude proportional to the static characteristic magnitude adapted to be fed to a matching amplifier by way of a shifting switch means and being adapted to be fed to a first differentiating element, at the output of which appears a first dynamic characteristic magnitude, one influencing means each being provided for each characteristic magnitude in which the characteristic magnitude is operable to be influenced with an evaluating function, the combining means including a combining element in which the evaluated characteristic magnitude are combined with each other into the control magnitude for the trailer brake.

22. An apparatus according to claim 21, characterized in that a power amplifier is operatively connected with the combining element.

23. An apparatus according to claim 22, characterized in that the output of the first differentiating element is fed to the input of a second differentiating element, at the output of which appears a second dynamic characteristic magnitude.

24. An apparatus according to claim 23, characterized in that the shifting switch means is adapted to be shifted into its second position upon engagement of the reverse speed, and in that an inverting amplifier and an influencing means connected in series therewith is provided which are connected in the second position of the shifting switch means between the path pick-up means and the matching amplifier.

25. An apparatus according to claim 22, characterized in that a potentiometer is provided as path pick-up means, at the pick-up member of which appears the output signal.

26. An apparatus according to claim 22, characterized in that the control installation with the exception of the power amplifier is operationally ready during the entire driving operation.

27. An apparatus according to claim 26, characterized in that a switch means is provided operable to energize the power amplifier only during actuation of the brake pedal.

28. An apparatus according to claim 27, characterized in that a power source is provided in the trailer which supplies energy for the actuation of the trailer brake when the trailer tears loose from the towing vehicle.

29. An apparatus according to claim 22, characterized in that a switch means is provided operable to energize the power amplifier only during actuation of the brake pedal.

30. An apparatus according to claim 29, characterized in that the last-mentioned switch means is the brake light switch of the towing vehicle.

31. An apparatus according to claim 21, characterized in that multiplication elements are provided as influencing means.

32. An apparatus according to claim 21, characterized in that a summing amplifier is provided as combining means.

33. An apparatus according to claim 21, characterized in that a means is provided which converts the control magnitude appearing at the output of the combining means into a pulse-width modulation signal.

34. An apparatus according to claim 13, characterized in that the measuring means includes means for measuring the static characteristic magnitude of forces occurring between the towing vehicle and the trailer which is a time invariant magnitude and means for measuring at least one dynamic characteristic magnitude of the forces occurring between the towing vehicle and the trailer which is a time variant magnitude.

35. An apparatus according to claim 13, characterized in that the measuring means includes means for measuring the static characteristic magnitude of the forces occurring between the towing vehicle and the trailer at any instant of time and means for measuring at least the rate of change of forces occurring between the towing vehicle and the trailer as at least one dynamic characteristic magnitude.

36. An apparatus according to claim 13, characterized in that the measuring means includes means providing a signal corresponding to the static characteristic magnitude of the forces occurring between the towing vehicle and the trailer and means for providing a signal corresponding to at least one dynamic characteristic magnitude of the forces occurring between the towing vehicle and the trailer, and that the combining means includes means for combining the signals to form a control signal for the brake force of the trailer brake.

37. An apparatus according to claim 13, characterized in that the measuring means includes means for measuring a static characteristic magnitude of the forces occurring between the towing vehicle and the trailer and means for forming at least a first derivatve with respect to time of the static characteristic magnitude as at least one dynamic characteristic magnitude of the forces occurring between the towing vehicle and the trailer.

* * * * *